United States Patent Office 2,862,905
Patented Dec. 2, 1958

2,862,905

PROCESS FOR PREPARING A THERMOSETTING RESIN FROM A SODIUM POLYMERIZED BUTADIENE POLYMER

Fred W. Banes, Anthony H. Gleason, and Joseph F. Nelson, Westfield, N. J., assignors to Esso Research and Engineering Company, a corporation of Delaware No Drawing. Application August 27, 1954
Serial No. 452,712

4 Claims. (Cl. 260—45.5)

This invention relates to the production of synthetic resinous materials which are completely insoluble, infusible, hard masses possessing good machineability and good dielectric properties.

It is known that linear polymers and copolymers of butadiene of an oily consistency can be cured at temperatures between 100 and 175° C. in the presence of 1–4% tertiary butyl peroxide.

During the preparation of such resins it is frequently advantageous to use a filler. However, the fillers heretofore used have in general a deleterious effect on the electrical properties of the finished resin causing power loss at high frequencies.

According to the present invention the above disadvantages are overcome by using a filler consisting solely of comminuted resin (5–300 mesh) prepared from a previous batch of materials. This can be conveniently accomplished by adding the resin to the oil while agitating slowly. The filler desirably may be used in proportions of 10 to 50% based on the resin-oil mixture. In addition to the filler, 5–40% of reactive monomers such as styrene, vinyl toluene, alkyl styrenes, vinyl naphthalene, and vinyl biphenyl may be present.

The polymers to which the present invention is primarily applicable are those prepared by copolymerizing 100 to 50 parts of butadiene-1,3, and 0 to 50 parts of styrene with sodium. A particularly suitable polymer is an oil copolymer of 75 to 85% butadiene and 15 to 25% styrene. The polymerization is carried out in a reaction diluent at temperatures ranging from about 25 to 95° C., or preferably between 40 and 90° C., and is desirably continued until complete conversion of monomers is obtained. About 1.2 to 5 parts, preferably 1.5 to 4 parts, of finely divided metallic sodium per 100 parts of monomers are used as catalyst. Materials used as diluents in the polymerization are inert hydrocarbons which remain liquid under the reaction conditions employed. Accordingly, the diluents employed have a boiling point between about 10 and 200° C., the low boiling diluents being useful where it is permissible to keep the reaction pressure sufficiently high to maintain the diluent in liquid condition at the reaction temperature used.

Preferred diluents are essentially aliphatic hydrocarbons such as naphtha having a boiling range between about 90 and 120° C. or straight-run mineral spirits such as "Varsol" having a boiling range between about 150 and 200° C. Butane, benzene, cyclohexane, xylenes, toluenes, pentanes and similar inert hydrocarbons are also useful, individually or in admixture with each other. The hydrocarbon diluents are used in amounts ranging from 100 to 500, preferably 150 to 300 parts per 100 parts of monomers. In other words, the resulting oily composition as synthesized normally contains about 20% to 50% of the polymer dissolved in a hydrocarbon solvent. When desired, more concentrated compositions can be produced from the synthesis product by stripping off excess solvent. For purposes of the present invention, it is desirable to concentrate non-volatile matter to at least 90 and preferably 100%. The presence of solvent is unnecessary and is undesirable except in small amounts.

Furthermore, to promote the original polymerization reaction and to secure the formation of a light-colored product, it is also desirable to employ in the polymerization about 10 to 40 or more parts of an ether promoter per 100 parts of monomers. Cyclic diethers of 4 to 8 carbon atoms having an —O—C—C—O— group, such as dioxane-1,4 and its methyl and ethyl homologues, have been found as particularly effective promoters. Other suitable ether promoters are aliphatic mono- or di-ethers of 4 to 8 carbon atoms, such as diethyl ether, diethyl ether of ethylene glycol, and diethyl ether of diethylene glycol. Finally, it is also beneficial in many cases, although not essential, to use about 5 to 35 weight percent (based on sodium) of an alcohol such as methanol, isopropanol or n-amyl alcohol, especially where the sodium catalyst particles are relatively coarse. The resulting polymeric oil is generally characterized by having a viscosity of 0.3 to 20 poises at 25° C. where the viscosity is determined on a 50% solution of oil in Varsol having a specific gravity of 0.79. The only limitation to the physical nature of the polymer is that it should have fluid characteristics at temperatures of 100° C. or lower.

The curing should take place over a rising temperature range of 100 to 150° C. The rate of increase will vary inversely with the thickness of the sample being cured. A typical schedule is as follows:

Not less than about 8 hrs. at 100–110° C.
Not less than about 18 hrs. at 110–120° C.
Not less than about 18 hrs. at 120–130° C.
Not less than about 18 hrs. at 130–150° C.

The schedule may be lengthened somewhat depending on the hardness and distortion temperature desired in the resin, but a stepwise increase in curing temperature is desirable both as a means of controlling the rate of polymerization and to minimize mold adhesion. Too rapid curing can cause the castings to crack as a result of inadequate heat dissipation.

The following examples illustrate the benefits to be obtained by the process of this invention.

*Example 1*

An oily copolymer of butadiene and styrene was prepared according to the following recipe:

| | |
|---|---|
| Butadiene _____ parts by wt__ | 80 |
| Styrene _____ do____ | 20 |
| Naphtha _____ do____ | 200 |
| Dioxane _____ do____ | 30 |
| Sodium _____ do____ | 1.5 |
| Isopropanol _____ do____ | 0.3 |
| Temperature _____ °C__ | 50 |

Complete conversion was obtained in eight hours. The catalyst was destroyed and removed from the resulting crude product. The product was finished to contain 100% non-volatile matter as described above. This product, having a viscosity of 2.0 poises at 50% N. V. M. was mixed with 3% by weight of dietertiary butyl peroxide and 2% by weight of butyl acrylate at 75° C. The mixture was poured into a smooth, 3-inch diameter tin pan which had been given a light film of silicone oil or polythene to prevent sticking. The casting was ½ inch thick. The pan and contents were placed in an electric oven and heated according to the following schedule:

| | °C |
|---|---|
| 18 hours at_____ | 105 |
| 24 hours at_____ | 115 |
| 24 hours at_____ | 125 |
| 24 hours at_____ | 135 |

The product had a Rockwell hardness of 96 and a distortion temperature of 87° C. The product is not thermoplastic and must be machined or cast to the desired shape. The impact strength of the resin is adequate for commercial usage. Under no load the resin possesses considerable form stability at temperatures above the distortion temperature. At higher states of cure the distortion temperature may range up to 150° C. or higher.

The dielectric properties of the resin are excellent, the dielectric constant being about 2.5 and the dielectric strength being about 800 volts per mil.

*Example 2*

An oily polymer was prepared according to the procedure described in Example 1 except that 100 parts of butadiene was used as the sole monomer. The product had a 50% Varsol solution viscosity of 3 poises. When the oil was mixed with 2.5% ditertiary butyl peroxide and cured according to the schedule:

|  | °C |
|---|---|
| 18 hours at | 110 |
| 24 hours at | 120 |
| 24 hours at | 135 |
| 24 hours at | 150 | the resin product had a Rockwell hardness of 110 and a distortion temperature of 175° C. As in the case of Example 1 some 25–30% volume shrinkage occurred during the curing cycle.

*Example 3*

Fifty parts of the resin of Example 1 was finely powdered and added to seventy parts of the oily copolymer of Example 1 with slow agitation. Two parts of ditertiary butyl peroxide were carefuly worked into the above mixture in a manner to avoid any entrapment of air. As soon as homogeneity was reached the formulation was cured by heating under the following schedule:

|  | °C |
|---|---|
| 15 hours at | 100 |
| 24 hours at | 120 |
| 24 hours at | 135 |
| 24 hours at | 150 |

Only 10–15 volume percent shrinkage occurred during this curing operation. Linear shrinkage was only about 5%. No difficulty was encountered with resin cracking. The product had a Rockwell hardness of about 100, a high distortion temperature, and its dielectric properties were equivalent to those of the resin described in Example 1.

*Example 4*

In a similar manner as in Example 3, castings were prepared using the resin of Example 2. The product resin was crack-free and underwent only about 10–15% volume shrinkage. The physical and electrical properties were equivalent to those obtained on the resin prepared solely from the polymer oil described in Example 2.

*Example 5*

One hundred parts of the resin of Example 1 was ground to particles of 5–20 mesh (coarser than that used in Example 3) and added to 100 parts of the oily copolymer of Example 1 with slow agitation. Two parts of ditertiary butyl peroxide were added and the mixture cured as in Example 3. The product had a Rockwell hardness of 111.

*Example 6*

The experiment of Example 5 was repeated except that 20 parts of the polymer was replaced with 20 parts of styrene. This product also had a hardness of 111.

The nature of the present invention having been thus fully set forth and specific examples of the same given, what is claimed as new and useful and desired to be secured by Letters Patent is:

1. A process for preparing a solid resin from a liquid sodium polymer selected from the group consisting of homopolymers of butadiene and copolymers of butadiene with up to 50% styrene which comprises grinding a polymeric resin selected from the group consisting of homopolymers of butadiene and copolymers of butadiene with styrene prepared by the sodium polymerization of the aforesaid monomers to the oil polymeric form and subsequent resinification with ditertiary butyl peroxide to a fine powder, mixing 10 to 50% of said powder with said sodium polymer and heating the mixture at a temperature between 110° C. and 175° C. in the presence of 2.0 to 4.0% of ditertiary butyl peroxide.

2. Process according to claim 1 in which the polymer is liquid polybutadiene.

3. Process according to claim 1 in which the polymer is an oily copolymer of 75 to 85% butadiene and 15 to 25% styrene.

4. Process according to claim 1 in which the process is carried out in the additional presence of 5 to 40% by weight of a reactive monomer selected from the group consisting of styrene, alkyl styrenes, vinyl naphthalene, and vinyl biphenyl.

References Cited in the file of this patent

UNITED STATES PATENTS

| 2,356,965 | Allison | Aug. 29, 1944 |
| 2,457,097 | Te Grotenhuis | Dec. 21, 1948 |
| 2,512,697 | Te Grotenhuis | June 27, 1950 |
| 2,541,748 | Daly | Feb. 13, 1951 |
| 2,638,462 | Borders | May 12, 1953 |